US006529556B1

(12) United States Patent
Perdue et al.

(10) Patent No.: US 6,529,556 B1
(45) Date of Patent: Mar. 4, 2003

(54) REMOTE CONTROL APPARATUS AND METHOD

(75) Inventors: Michael Kelly Perdue, Indianapolis, IN (US); Lori Rene Bolduc, Westfield, IN (US); James Alan Strothmann, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/331,996

(22) PCT Filed: Jan. 30, 1998

(86) PCT No.: PCT/US98/01783

§ 371 (c)(1),
(2), (4) Date: Nov. 12, 1999

(87) PCT Pub. No.: WO98/34207

PCT Pub. Date: Aug. 6, 1998

Related U.S. Application Data

(60) Provisional application No. 60/036,794, filed on Jan. 31, 1997.

(51) Int. Cl.[7] .................................................. H04N 5/44
(52) U.S. Cl. ........................ 375/260; 341/176; 348/734
(58) Field of Search ................................ 375/295, 260, 375/299, 346, 347; 370/280, 294; 341/176; 348/734; 455/151.1, 151.2

(56) References Cited

U.S. PATENT DOCUMENTS

| | | | | |
|---|---|---|---|---|
| 4,904,993 | A | 2/1990 | Sato | |
| 5,515,051 | A | 5/1996 | Tanaka et al. | |
| 5,659,883 | A * | 8/1997 | Walker et al. | 359/146 |

FOREIGN PATENT DOCUMENTS

| | | | |
|---|---|---|---|
| EP | 0721282 | 7/1996 | H04N/5/445 |

OTHER PUBLICATIONS

PCT Search Report dated Jun. 30, 1998.

* cited by examiner

*Primary Examiner*—Stephen Chin
*Assistant Examiner*—Kevin Kim
(74) *Attorney, Agent, or Firm*—Joseph S. Tripoli; Paul P. Kiel

(57) ABSTRACT

An apparatus and a method for providing remote control capability involves transmitting IR and RF signals in a time multiplexed manner. The present apparatus comprises an input device, an IR signal transmitter, a RF signal transmitter and a controller operatively coupled to the input device, the IR signal transmitter and the RF signal transmitter. The controller generates and applies the IR and RF signals to the respective signal transmitters in time multiplexed manner. The IR and RF signals may be transmitted using different protocols without significantly increasing the computing capacity of the controller as compared to a controller of a remote control device which transmits only one type of remote control signal.

15 Claims, 4 Drawing Sheets

REMOTE CONTROL APPARATUS AND METHOD

This application claims the benefit of provisional application Ser. No. 60/036,794, filed Jan. 31, 1997.

BACKGROUND OF THE INVENTION

The present invention relates to an apparatus and a method for transmitting and receiving remote control signals and more particularly to an apparatus and a method for transmitting and receiving a plurality of remote control signals for controlling an electronic device.

A variety of remote control devices for transmitting remote control signals to control various electronic devices are known. Such remote control devices generally include an input device, such as a keypad, for allowing user input, coupled to a controller which is in turn coupled to a signal transmitting circuit. In response to a user input, the controller generates an appropriate remote control signal using look up tables, and the like, from memory and causes the signal transmitting circuit to transmit the remote control signal. The signal transmitting circuit may be designed to transmit the remote control signal in a number of different forms, including, but not limited to, an IR signal and a RF signal.

One commonly used method of sending remote control signals is to transmit the signals in IR form. Remote control devices that transmit IR signals are widely used with household electronic devices. The format of the IR signal is determined by the manufacturer for each model and many such formats are known and used. Each format specifies a set of signal characteristic, which include, but are not limited to signal duration, transmission and pause intervals, carrier frequency, pulse width and pulse modulation.

However, there are several disadvantages associated with using IR signals to control an electronic device. First, the IR signal is directional and as such requires the user to point the remote control device toward the controlled device for proper transmission performance. Also, the IR signal may have a relatively short range and is easily blocked by objects such as walls, floors, ceiling and the like, so the remote control device must generally be used in the same room in which the controlled device is located.

Also, many of the IR signal formats currently used do not have sufficient data carrying capacity to transmit all the remote control messages required for control of many modern electronic devices. For example, in addition to the conventional remote control messages associated with household electronic devices, such as ON, OFF, Channel Up, Channel Down, etc., many modern electronic devices, such as satellite receivers, may require the remote control device to send other forms of data, such as ASCII data for sending alpha-numeric characters. Many existing IR signal formats were not designed to handle such additional data and simply do not include enough capacity to carry the additional types of data.

Another method of sending remote control signals is to transmit the signals in RF form. RF signals are generally non-directional and have greater range than IR signals. RF signals may also be transmitted through objects such as walls, and the like, so that the user can use the remote control device to control a device in a separate room. This extended range and ability to transmit messages through objects are beneficial in situations where a central device, such as a set top box or a satellite receiver, provides input to a plurality of devices located throughout different rooms in a building. Also, RF signal formats generally have wider bandwidths than IR signal formats.

As such, it is desirable to be able to use RF signals to control modern electronic devices. However, devices and methods using IR signals remain popular and are widely used. In order to maintain backward compatibility, i.e., allow a remote control device to control existing devices which utilize IR signals, a remote control device should also be capable of transmitting IR signals. Therefore, it is desirable to have an apparatus and a method for easily and efficiently transmitting some combination of IR and RF signals to take advantage of the features of the two signal transmission forms.

One method of transmitting a combination of IR and RF signals is to transmit a particular remote control signal in both an IR form and a RF form. In such a method, a controller generates the appropriate signal format in response to a user keypress and applies that signal format to both the IR signal transmitter and the RF signal transmitter simultaneously. In this way, the same signal is transmitted in both IR and RF forms. However, such a method does not totally overcome the problems noted above. If the transmitted signal is based on one of the conventional IR signal formats, the signal format may not have sufficient capacity to carry all of the data that the remote control device is required to send. If the transmitted signal is based on a RF signal format, the remote control may not be backward compatible with devices that use pre-existing IR signal formats. In other words, the RF signal format, while having a larger data capacity may not be usable with some types of electronic devices.

One way of overcoming the problems associated with transmitting a single signal is to simultaneously transmit different IR and RF signals, each signal based on a respective signal format, so that the IR signal provides backward compatibility while the RF signal provides a format that can transfer more data than the IR signal. However, such a method is difficult to implement from a cost standpoint. In order to implement this method, the computing power of the controller must be increased so that the controller can simultaneously process, generate and apply the two types of signal formats to both the IR and RF signal transmitters each time the user provides an input, for example by pressing a key. Such an increase in computing power requires a larger, more expensive controller which may raise the overall cost of the remote control device to unacceptable levels.

SUMMARY OF THE INVENTION

Therefore, what is required is an apparatus and a method for efficiently and cost effectively transmitting and/or receiving a combination of IR and RF signal formats each time a remote control message is required to be transmitted and/or received. The present invention involves an apparatus and method which efficiently and cost effectively transmits and/or receives a combination of IR and RF signals by transmitting and/or receives the signal in a time multiplexed arrangement.

In accordance with one aspect of the present invention, a remote control apparatus is provided having an input device for receiving remote control messages from a user, an IR signal transmitter, a RF signal transmitter, and a controller operatively coupled to the input device, the IR signal transmitter and the RF signal transmitter, the controller generating an IR signal and causing the IR signal transmitter to transmit the IR signal, and generating a RF signal and causing the RF signal transmitter to transmit the RF signal in a multiplexed manner in response to a user input.

In accordance with another aspect of the present invention, the controller of the remote control apparatus causes the IR signal transmitter to transmit the IR signal during predetermined intervals interrupted by predetermined pause periods, and causes the RF signal transmitter to transmit the RF signal during the predetermined pause periods.

In accordance with another aspect of the present invention, the controller of the remote control apparatus causes the IR signal transmitter to transmit the IR signal during predetermined intervals interrupted by predetermined pause periods, the duration of the predetermined pause period determined by the duration of transmission of the RF signal, and the controller causes the RF signal transmitter to transmit the RF signal during the predetermined pause periods.

In accordance with another aspect of the present invention, a remote control apparatus is provided comprising a first signal receiver adapted to receive a first remote control message formatted in accordance with a first signal format; a second signal receiver adapted to receive a second remote control message formatted in accordance with a second signal format, the second remote control message time-multiplexed with the first remote control message, and a controller operatively coupled to the first and second signal receivers, the controller decoding and processing the first remote control message in accordance with the first signal format upon receiving the first remote control message, and decoding and processing the second remote control message in accordance with the second signal format upon receiving the second remote control message.

In accordance with another aspect of the present invention, a method of transmitting IR and RF signals is provided comprising the steps of receiving a remote control command, and, in time multiplexed manner, generating an IR signal corresponding to the user input and transmitting the IR signal, and generating a RF signal corresponding to the user input and transmitting the RF signal.

BRIEF DESCRIPTION OF THE DRAWINGS

The invention will be described with reference to the accompanying drawings, wherein.

DETAILED DESCRIPTION OF AN EXEMPLARY EMBODIMENT

Figure 1:
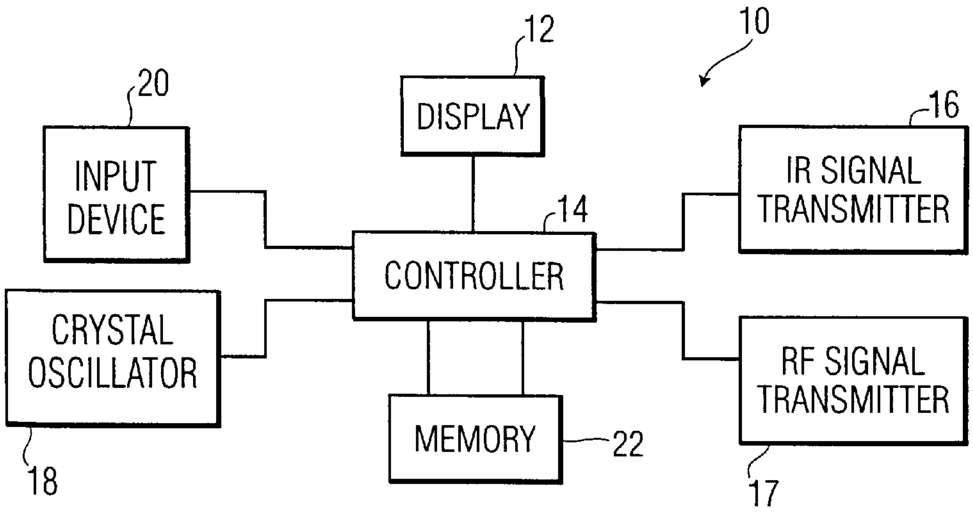
FIG. 1 is a block diagram showing the elements of a remote control device in accordance with one embodiment of the present invention.

Referring to FIG. 1, there is shown a simplified block diagram of remote control 10. Remote control 10 may take many forms, such as a stand alone unit or incorporated within another device, and be adapted for use with a variety of electronic devices. For example, devices which incorporate the elements and signal transmission features of remote control 10 include, but are not limited to, a wireless keyboard, wireless pointing devices and handheld remote control devices for controlling consumer electronic devices. The elements for transmitting remote control messages are generally known in the art.

Generally, user input of remote control commands or data is received through input device 20 which includes various control buttons, device selection buttons, numerical buttons and the like. It is to be understood that input device 20 may include any device whereby the user can provide an input to remote control 10 and includes, but is not limited to, a keypad matrix, and a mouse, trackball, joystick or other types of pointing elements. Input device 20 is operatively coupled to controller 14 which controls the overall operation of remote control 10. In particular, controller 14 receives the user input and generates an appropriate remote control signal. Controller 14 may comprise any one of a plurality of conventionally known devices, which may be in integrated circuit form, that are capable of performing control functions. Such suitable controllers include, but are not limited to ST 7291 and ST 7225 manufactured by SGS Thomson Microelectronics. The timing of controller 14 is controlled by crystal oscillator 18.

Upon receiving a user input from keypad matrix 20, controller 14 uses the designated reference code, or other identifying information to look up the desired information from the product code look up tables stored in memory 22 in order to identify and generate the correct signal structure. The signal structure characteristics include, but are not limited to, the proper carrier frequency, pulse width, pulse modulation and overall signal timing information. Memory 22 may comprise RAM and/or ROM and be located either internal or external to the enclosure associated with remote control 10. Controller 14 applies the appropriate signals to IR transmitter 16 and/or RF transmitter 17 to send control signals to the device to be controlled. Controller 14 also controls display 12, which may include, for example, indicator LEDs, to indicate that a remote control signal has been transmitted. When the remote control signal is transmitted, an IR receiver and/or a RF receiver associated with the controlled device detects the remote control signal and provides the signal to the processor of the controlled device for decoding and processing.

Remote control 10 may be of the universal remote control type which is capable of controlling one of a plurality of designated electronic devices according to a reference code, or other signal format identifying information, selected by the user. The reference code may be selected using for example, the direct. manual entry method, the semi-automatic stepping entry method, the automatic entry method, or any other suitable method of selecting and entering a reference code. If remote control 10 is of the universal remote control type, remote control 10 uses the identifying information to generate the appropriate signal associated with the particular manufacturer and model.

Figure 2:
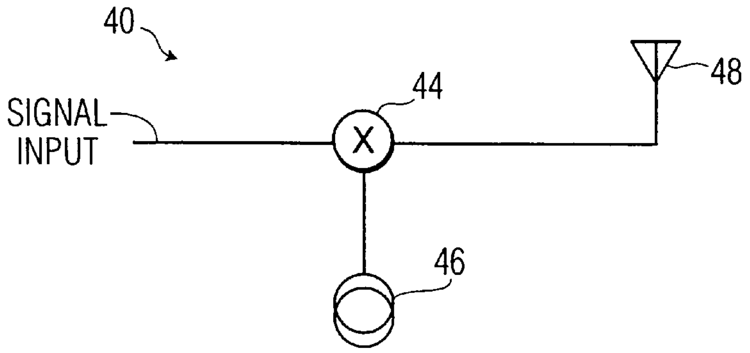
FIG. 2 is a block diagram illustrating the basic elements of a RF signal transmitter.
Figure 3:
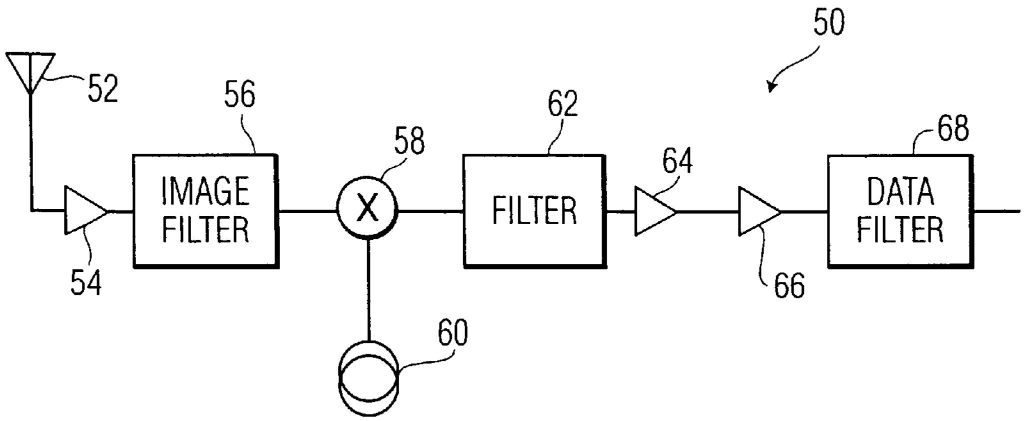
FIG. 3 is a block diagram illustrating the basic elements of a RF signal receiver.

FIGS. 2 and 3 show RF transmitter 40 and RF receiver 50, respectively, suitable for use in the present invention. As shown in FIG. 2, RF transmitter 40 comprises bipolar oscillator 46 with a one-port SAW resonator for frequency stabilization coupled to mixer 44, which drives a linearly polarized loop antenna 48 which is typically located in the enclosure of remote control 10. When the user provides an input, for example by pressing a key, controller 14 generates a modulating signal which is used to turn oscillator 46 ON and OFF for amplitude shift keying of the carrier. It is desirable that transmitter 40 include minimal parts due to limited space in the enclosure of remote control 10.

A suitable RF receiver 50 for the present invention is shown in FIG. 3. RF receiver 50 will typically be located in the enclosure of the controlled device. The receiver is capcitively coupled to antenna 52, which may advantageously be a line cord that acts as a receive antenna, in which case the RF signal enters through a connector disposed on the enclosure around RF receiver 50. The signal is amplified by low-noise amplifier 54, which decreases the total system noise level while increasing receiver sensitivity. The output of amplifier 54 passes through trap filter 56 which provides rejection to the image frequency. The signal is then converted via mixer 58 and local oscillator 60 to an intermediate frequency (IF) of 10.7 MHz. The IF signal is passed through filter 62 and amplified by a chain of high gain logarithmic amplifiers 64 which convert the signal into an output current. The output current is converted to a voltage, passed to a noise adaptive threshold comparator 66, and lowpass filtered by data filter 68 before being sent to the processor of the controlled device for decoding and processing.

Any one of a number of conventionally known IR transmitter and IR receiver arrangement may be used in the present invention. Generally, an IR transmitter includes an LED coupled to an LED driver circuit which is controlled by controller 14. In response to a user input, controller 14 generates a remote control signal in accordance with the look up table in memory 22 and applies the remote control signal to the LED driver circuit. The LED driver circuits drives the LED to project an IR signal toward the controlled device. An IR light sensor in the IR receiver detects the IR signal and provides the signal to a processor in the controlled device for decoding and processing. Suitable IR and RF transmitter and receiver arrangement include, but are not limited to, those found in DSS System DS5450RB manufactured by Thomson Consumer Electronics Inc., of Indianapolis, Ind.

Figure 4:
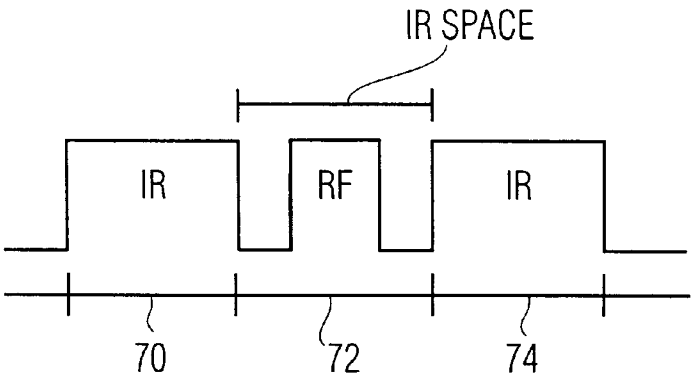
FIG. 4 is a diagram illustrating a basic time-multiplexed sequence of IR and RF signals.

In order to transmit both an RF signal and an IR signal for each user input, remote control 10 transmits the two signals in a time multiplexed manner. A general scheme for transmitting the signals in time multiplexed manner is shown in FIG. 4, wherein remote control 10 transmits the IR signal in time interval 70, the RF signal in time interval 72, the IR signal in time interval 74 and repeats the sequence for as long as the user input continues, for example, when a key is continuously held down. As such, the IR and RF signals are transmitted in alternating fashion with the RF signal transmitted during the pause interval of the IR signal. In this manner, the IR and RF signals are alternated and transmitted for as long as the user input is provided at input device 20.

The transmission sequence described above is particularly suitable for use with existing IR signal protocols as such protocols usually require repeated intervals of IR signal transmission interrupted by pause intervals. RF signals can easily be transmitted during the pause intervals without affecting the IR signal transmissions. Typically, the pause interval between the IR transmissions lasts between 2–10 mS. Therefore, the RF signal protocol must be designed to fit within the required time interval. An RF signal protocol which is especially suitable for use with the present invention is described in co-pending U.S. patent application Ser. No. 09/341,208, entitled "Communications System for Remote Control Systems" which is assigned to the assignee of the present application, now U.S. Pat. No. 6,424,285.

Transmitting IR and RF signals in this manner allows remote control 10 to efficiently transmit IR and RF signals wherein each signal has a respective signal format without requiring controller 14 to have significantly more computing capacity than a controller which handles only one of the signal formats. Since controller 14 time multiplexes the two signals, controller 14 processes the data and signals associated with the IR and RF signals in sequence rather than simultaneously. Due to this sequential processing arrangement, controller 14 is able to process the data and signals associated with the IR signal and the RF signal without significant increase in computing capacity.

To allow rapid transmission of an RF signal, and subsequent reaction by a RF signal capable destination device, prior to transmission of an IR signal, a RF signal may be transmitted immediately after a user input then followed by an IR/RF signal transmission sequence. Such a transmission sequence is advantageous for reducing the device response time when the destination device responds to RF signals only. On the other hand, since the RF signal transmission time is very short compared to the IR signal transmission time, transmitting the RF signal first does not significantly reduce the response time of a device that responds to IR signals only.

Figure 5:
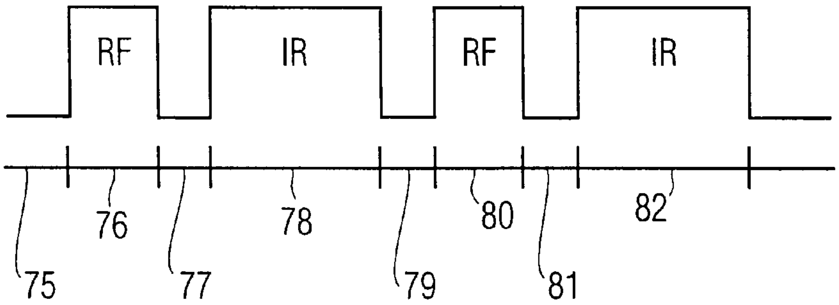
FIG. 5 is a diagram illustrating an initial RF signal transmission followed by an IR and RF signal transmission sequence in response to a user input.

Such a sequence is shown in FIG. 5 and described below. During time interval 75, remote control 10 receives the initial user input and determines the data necessary to form an RF transmission and in time interval 76 transmits the RF signal. During time interval 77, remote control 10 processes data to form an IR transmission and in time interval 78 transmits the IR signal. During time interval 79, remote control 10 determines whether the key is still pressed and if so, retransmits the RF signal in time interval 80. The IR and RF signal transmissions are repeated thereafter as the user input continues, for example by keeping a key pressed down. The only delay times between the signal transmissions would be the data processing times noted above. Since the RF signal transmission duration is relatively short, typically 5–8 mS, the sequence described above results in a negligible delay in the IR signal transmission performance yet provides quick delivery of the RF signal upon each keypress.

Advantageously, the IR/RF signal transmission sequence may be arranged so that the RF signal transmission occurs during the pause interval between the IR signal transmissions. Such an arrangement does not violate existing IR protocol specifications if the RF signal transmission duration is within the proper IR signal pause limits, thus remaining compatible with existing IR receivers. Such an arrangement also increases the average number of RF transmissions from a single keypress, as periods of non-transmission are reduced, thereby increasing the probability of successful reception in a noisy RF environment. Further, such an arrangement results in a pseudo-random period of RF/IR retransmissions due to the data-dependent variable length of the RF message. This increases the probability that a user will transmit an unjammed RF message from a single keypress while in the range of several other operating RF remotes.

Figure 6:
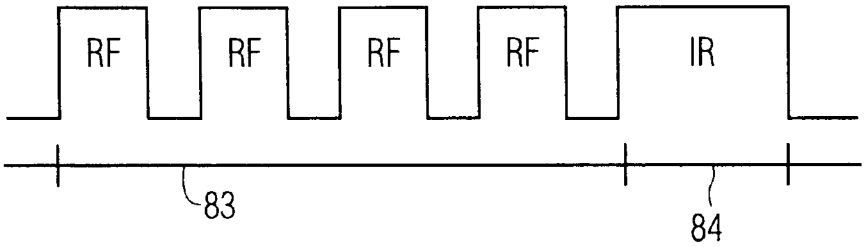
FIG. 6 is a diagram illustrating an IR and RF signal transmission sequence for time demanding applications.

Additionally, the present time multiplexing method may be modified to provide a longer duration of RF signal transmissions as necessary for time demanding applications, for example application wherein large amounts of data must be transmitted in a relatively short period of time. Such a scheme is shown in FIG. 6. Here, the first portion of the signal transmission comprises RF signals and the IR signal transmissions are temporarily suspended. Such a scheme may advantageously be used in time demanding applications such as those involving the use of joysticks, mouse, trackball, etc. Therefore, the order of multiplexing the signal transmissions may be arranged by controller as necessary based on the message being sent or the devices being used.

Figure 7:
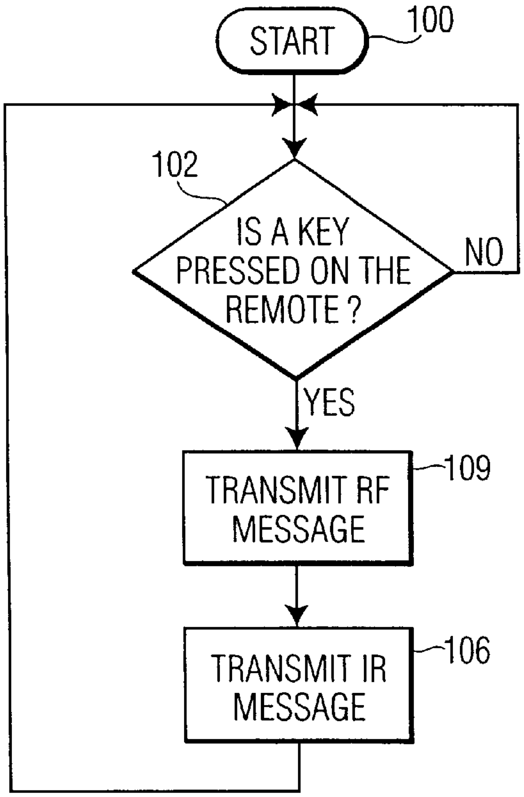
FIG. 7 is a flowchart illustrating an IR and RF signal transmission method.

The steps for transmitting the time multiplexed signals are shown in FIG. 7. After entering the procedure in step 100, the controller checks in step 102 whether a key is pressed on the remote. If a key is pressed, controller generates the appropriate RF signal and causes RF transmission circuitry 17 to transmit the RF signal in step 104. Controller 14 then generates the appropriate IR signal and causes IR transmission circuitry 16 to transmit the IR signal in step 106.

The time multiplexed method used by remote control 10 and described above is in contrast to the IRIRF remote controls which transmit IR and RF signals using the same format. By using different formats for the IR and RF signals, remote control 10 provides the advantages of increased data capacity of RF signals with the backwards compatibility of using IR signal formats. Multiplexing the IR and RF signals allows the present remote control to send IR and RF signals in different formats thereby allowing the remote control to transmit a signal that uses a signal protocol which can carry more data and expand as required, yet transmit another signal to maintain backwards compatibility with devices based on IR signal protocols. Also, multiplexing the IR and RF signals as described above allows controller 14 to sequentially process and transmit IR and RF signals having different formats for each key press rather than requiring controller 14 to simultaneously process the IR and RF signals. The present remote control may be realized using a controller having similar computing capacity as a controller associated with a remote control which transmits only IR or RF signals because controller is only required to process the IR and RF data sequentially rather than simultaneously. As such, the present invention provides the ability to transmit IR and RF signals of different formats, or protocols, for each user input using a controller having similar computing capacity as a controller which handles one type of signal. Therefore a cost savings may be realized.

Figure 8:
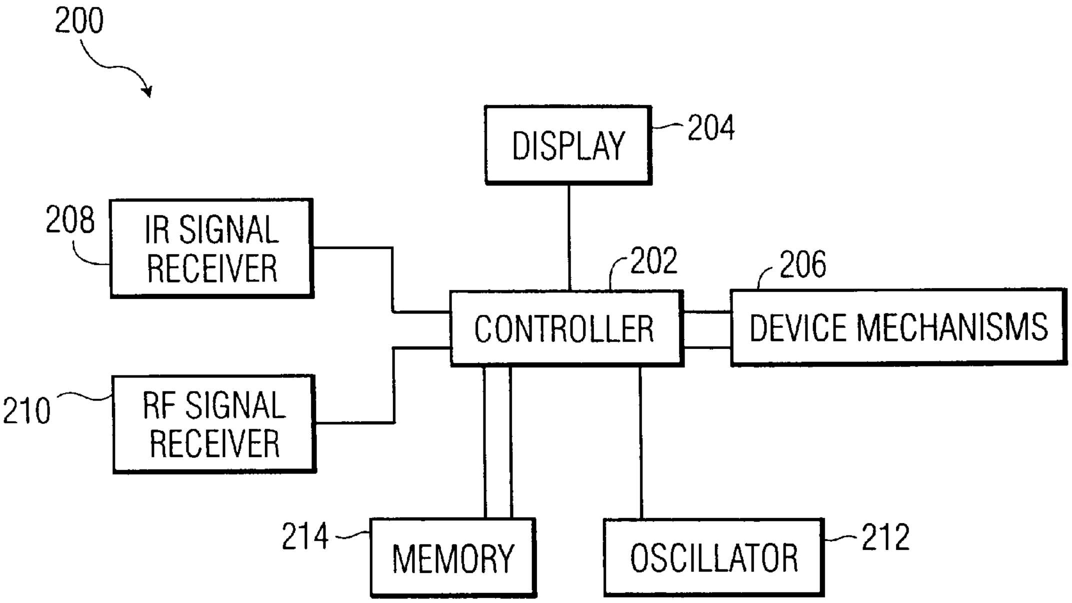
FIG. 8 is a block diagram illustrating the basic elements of a receiver suitable for use with the present remote control apparatus.

A suitable receiver for detecting, decoding and processing the IR and RF signals discussed above is now described. As shown in FIG. 8, suitable receiver 200 comprises controller 202 which receives the IR and RF signals through IR signal receiver 208 and RF signal receiver 210. Controller 202 decodes and processes the received remote control signal and sends control signals to device mechanism 206 to perform the operation specified by the received remote control signal. Device mechanism 206 comprises any one of a plurality of components included in an electronic device that may be controlled by the remote control signal. Such components include, but are not limited to, RF tuners, VCR tape transport, DSS transport decoder and TV tube deflection hardware. Controller 202 is also connected to memory 214 and display 204, which may include, for example a front panel indicator for displaying the status of the receiver, a set of indicator lights, an alpha-numeric display or a display screen. The timing of controller 202 is controlled by oscillator 212.

When an IR signal is directed at receiver 200, IR signal receiver 208 detects and provides the IR signal to controller 202. Controller 202 decodes and processes the received IR signal based on the appropriate IR format specification. Likewise, controller 202 receives RF signals via RF signal receiver 210 and decodes and processes the received RF signal based on the appropriate RF format specification. The elements of receiver 200 and their operation are generally known in the art.

Receiver 200 may be designed to perform the receiving, decoding and processing functions in a number of inputs to the present method are the timing from the last operation and the state of a keypress bit in the RF message.

The timing from the last operation is measured by two separate timers, a short timer and a long timer. The timers may be implemented in software or in hardware, e.g., as part of the controller IC. The short timer determines if the repeated messages from a single remote keypress have come to an end or if a message is missing from the middle of a repeated sequence. The long timer is used to determine if a keypress toggle bit should be checked. The keypress toggle bit is a status flag that may be included in the RF message and is toggled with each keypress. Suitable timer value for the short timer is 4–6 mS and for the long timer is 900–1100 mS.

The short timer is setup for a time that would not expire when a repeated RF message is received, yet will expire if a message is missing from the repeated sequence due to interference or a key release. The long timer is setup for the period that the requested function should be repeated if a remote key is held down indefinitely. The timers are reset after the RF receiver performs the requested operation from the remote and run until the receiver processes a new valid RF command.

Figure 9:
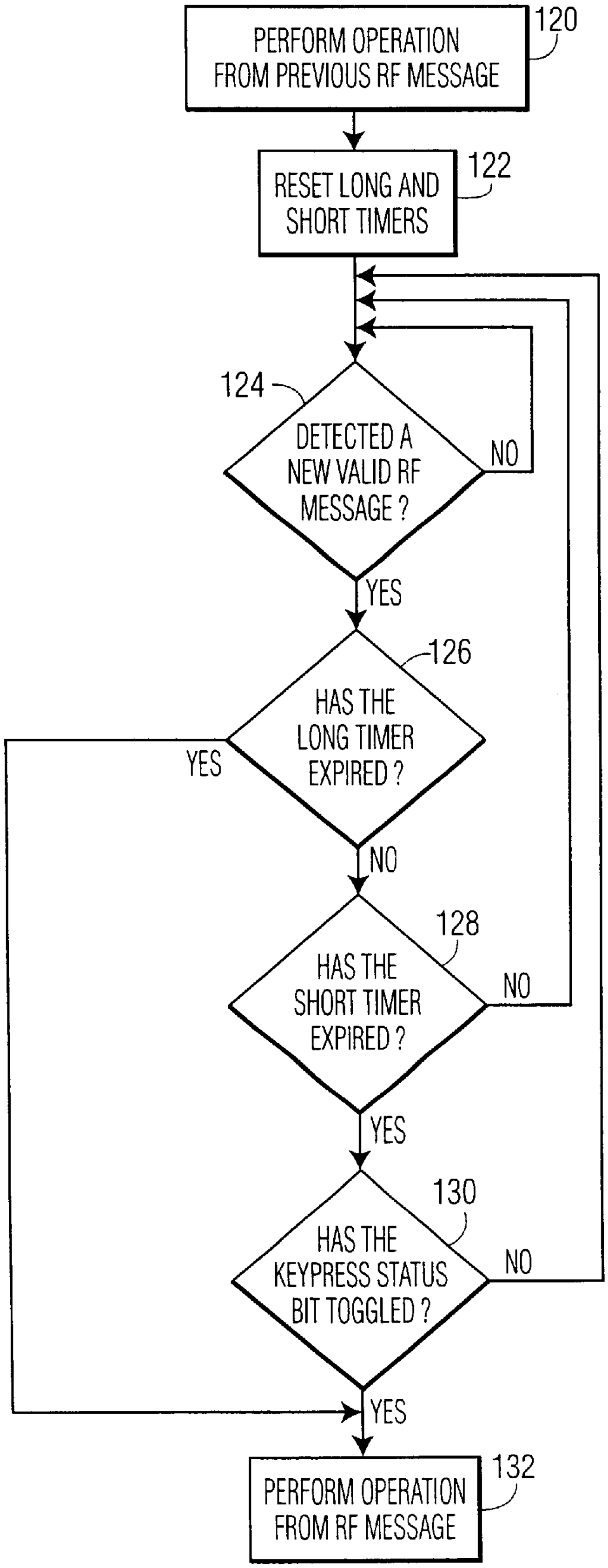
FIG. 9 is a flowchart illustrating a RF message debouncing method.

A flowchart for implementing the present method is shown in FIG. 9. After performing the operation from the previous RF message in step 120, the RF receiver controller resets the long and short timers in step 122 and waits for a new RF message. When a new RF message is detected in step 124, the receiver controller determines whether the long timer has expired in step 126. If so, the receiver controller performs the operation of the new RF message. If not, the receiver controller checks whether the short timer has expired in step 128. If not, the receiver controller returns to step 124 to detect a new valid RF message. If so, the receiver controller checks whether the keypress status bit has toggled in step 130. If so, the receiver controller performs the operation of the new RF message. If not, the receiver controller returns to step 124 to detect a new valid RF message. Therefore, it can be seen that the operation for a new RF message is performed if the long timer has expired or if the short timer has expired and the keypress status bit in the RF message has toggled to indicate a new keypress.

It will be apparent to those skilled in the art that although the invention has been described in terms of an exemplary embodiment, modifications and changes may be made to the disclosed embodiment without departing from the essence of the invention. For example, remote control 10 may be modified to allow the user to program a security code into remote control 10 using a preexisting remote control programming sequence so that remote control 10 includes the security code in the signal transmissions and the controlled device only accepts control signals which include the proper security code. Such a modification is advantageous in an environment wherein many RF remote control devices are being used because the security code prevents signals from other neighboring remote control devices from interfering with the operation of the controlled device. Further, remote control 10 may be configured to transmit one of a plurality of security codes for controlling a designated one of a plurality of electronic devices in the same household. For example, one security code may be assigned to a satellite receiver and a different security code may be assigned to a television receiver. Any conventionally known method for programming remote control devices may be used to assign the security codes, for example, the user may program the remote control pressing an appropriate device key, for example, TV, VCR or DSS, and then entering a security code, for example a three digit code. The user may be guided through the programming sequence by an appropriate user interface, for example, a menu on an On Screen Display.

Therefore, it is to be understood that the present invention is intended to cover all modifications as would fall within the true scope and spirit of the present invention.

What is claimed is:

1. A remote control apparatus, comprising:

an input device for receiving an input from a user;

a first signal transmitter;

a second signal transmitter;

a controller operatively coupled to said input device, said first signal transmitter and said second signal transmitter, said controller, in response to a user input, causing said first signal transmitter to transmit a first remote control signal comprising an alternating sequence of transmit intervals and pause intervals and causing said second signal transmitter to transmit a second remote control signal during said pause intervals of said first control signal, to thereby provide an output comprising an alternating sequence comprising first remote control signal transmit intervals and second remote control signal intervals.

2. The remote control apparatus of claim 1, wherein said first remote control signal is formatted in accordance with a first signal format and said second remote control signal is formatted in accordance with a second signal format.

3. The remote control apparatus of claim 1, wherein said first signal transmitter comprises an IR signal transmitter and said second signal transmitter comprises a RF signal transmitter.

4. The remote control apparatus of claim 3, wherein said second remote control signal includes a security code associated with said second signal transmitter.

5. The remote control apparatus of claim 4, wherein said security code is selected by the user using an On Screen Display.

6. The remote control apparatus of claim 5 wherein said controller changes the transmission sequence of said first and second control signals in accordance with said remote control input.

7. A method for transmitting remote control signals, comprising the steps of:

receiving a user input; and transmitting in response to the user input a first remote control signal comprising an alternating sequence of transmitting intervals and pause intervals using a first signals transmitter; and transmitting a second remote control signal during the pause intervals of the first remote control signal, to thereby provide an output comprising an alternating sequence of first remote control signal transmitting intervals and second remote control signal intervals.

8. The method of claim 7, wherein said transmitting step comprises transmitting the first remote control signal in accordance with a first signals format and the second remote control signal in accordance with a second signal format.

9. The method of claim 8, wherein said transmitting step comprises the step of transmitting the first and second remote control signals using IR and RF transmitters, respectively.

10. The method of claim 9, wherein said transmitting step comprises transmitting a second remote control signal having a security code associated with the second signal transmitter.

11. A remote control system, comprising:

a first signal receiver adapted to receive a first remote control signal formatted in accordance with a first signal format comprising an alternating sequence of transmit intervals and pause intervals;

a second signal receiver adapted to receive a second remote control signal formatted in accordance with a second signal format, said second remote control signal being transmitted during said pause intervals of said first remote control signal, whereby the received signal comprises an alternating sequence of first remote control signal transmit intervals and second remote control signal intervals; and a controller operatively coupled to said first and second signal receivers, said controller decoding and processing said first remote control signal in accordance with said first signal format upon receiving said first remote control signal, and decoding and processing said second remote control signal in accordance with said second signal format upon receiving said second remote control signal.

12. The remote control system of claim 11, wherein said first signal receiver comprises an IR signal receiver and said second signal receiver comprises a RF signal receiver.

13. The remote control system of claim 12, further comprising a remote control signal transmitter, said remote control signal transmitter having first and second signal transmitters, said first and second signal transmitters adapted to transmit said second remote control signal during said pause intervals of said first remote control signal.

14. The remote control system of claim 12, wherein said controller decodes and processes said first and second remote control signals in a predetermined order in accordance with a predetermined priority setting, and said system further comprises an input device for receiving user input, said predetermined priority setting being determined in accordance with said user input.

15. The remote control system of claim 14, wherein said predetermined priority setting is selected using an On Screen Display.

* * * * *